US007500251B2

(12) United States Patent
Sugihara et al.

(10) Patent No.: US 7,500,251 B2
(45) Date of Patent: Mar. 3, 2009

(54) METHOD AND SYSTEM FOR MANAGING PROGRAMS FOR WEB SERVICE SYSTEM

(75) Inventors: Jun Sugihara, Yokohama (JP); Atsushi Otake, Yokohama (JP); Nobuyoshi Sakai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 459 days.

(21) Appl. No.: 10/858,380

(22) Filed: Jun. 2, 2004

(65) Prior Publication Data

US 2005/0038771 A1     Feb. 17, 2005

(30) Foreign Application Priority Data

Jun. 4, 2003     (JP) ............................. 2003-158755

(51) Int. Cl.
G06F 3/00 (2006.01)
G06F 9/44 (2006.01)
(52) U.S. Cl. ..................... 719/318; 719/313; 719/315; 719/316
(58) Field of Classification Search ......... 719/313–316, 719/318
See application file for complete search history.

(56) References Cited

U.S. PATENT DOCUMENTS

| 2002/0174178 | A1* | 11/2002 | Stawikowski ............... 709/203 |
| 2002/0178254 | A1* | 11/2002 | Brittenham et al. ......... 709/224 |
| 2003/0110242 | A1* | 6/2003 | Brown et al. ................ 709/222 |
| 2004/0199636 | A1* | 10/2004 | Brown et al. ................ 709/227 |

FOREIGN PATENT DOCUMENTS

| JP | 2000-276341 | 10/2000 |
| JP | 2001-155077 | 6/2001 |

OTHER PUBLICATIONS

U.S. Appl. No. 10/715,121, filed Nov. 18, 2003, "Entitled: Program Changing Method".

U.S. Application No. (not yet assigned) filed Jun. 2, 2004, "Entitled: Method and System For Mananging Programs For Web Service System".

"Java Web Services", David A. Cbappell et al. O'Reilly & Associates, Inc., Mar. 2002, pp. 25-53, pp. 73-95, pp. 98-139.

Dirk Reinshagen, XML messaging, the first part, Java WORLD, Japan, IDG Japan Ltd. Jan. 1, 2002, vol. 6, No. 1, pp. 179 to 180.

Hideaki Inoue, Exploitation & Selection: Web service, Nikkei open system, Japan, Nikkei BP co., Aug. 26, 2002, No. 113.

Toshiro Takase, SOAP guide and Recent movement, IEICE Technical Report, Japan, the Institute of Electronics Information and Communication Engineers, Jan. 9, 2003, vol. 102, No. 560, pp. 55 to 56, IN2002-164.

Yoichiro Tanaka, Special project, Basic Web service direct guide, Section 3, UDDI, JAVA Press, Japan, Gijyutu Hyoron co., Oct. 15, 2002, vol. 26, pp. 135-138.

* cited by examiner

*Primary Examiner*—William Thomson
*Assistant Examiner*—Richard Pantoliano, Jr.
(74) *Attorney, Agent, or Firm*—Antonelli, Terry, Stout & Kraus, LLP.

(57) ABSTRACT

A second program which uses the function of a first program is corrected in accordance with correction of the first program. A program management method of changing the second program in accordance with change of the first program is provided. Interface definition information indicating an interface of the first program is monitored. When change of the interface definition information is detected, the change of the interface definition information is notified to the second program which uses the function provided by the first program. The notification is received to change the second program.

6 Claims, 15 Drawing Sheets

FIG.6

```
...
< message name = " setMemInfoMsg " >              ~67
  < part name = " Name " type = "xsd : string" / >   ~68
  < part name = " Address " type = "xsd : string "/ > ~69
  < part name = " Age " type = "xsd : string" / >    ~70
< /message >
  ...
```
~53

FIG.7

```
...
< message name = " setMemInfoMsg " >              ~67
  < part name = " Name " type = "xsd : string" / >   ~68
  < part name = " Address " type = "xsd : string" / > ~69
  < part name = " Age " type = "xsd : string" / >    ~70
  < part name = " Birthday " type = "xsd : string" / > ~71
< /message >
  ...
```
~54

```
...
< SOAP-ENV : Body >
    < m : reqInfo xmlns : m = " http : //poi.com/soapbody " >  ~72
        < m : destination > http : //qwe.com/soap < /m:destination >  ~73
        < m : condition > x2v6yv1u-ww6x-087y-z403-u9v484zz51yy < /m : condition >  ~74
        < m : interval > 3600 < /m : interval >  ~75
    < /m : reqInfo >
< SOAP-ENV : Body >
...
```

METHOD AND SYSTEM FOR MANAGING PROGRAMS FOR WEB SERVICE SYSTEM

CROSS-REFERENCE TO RELATED APPLICATION

This application relates to U.S. patent application Ser. No. 10/715,121 filed on Nov. 18, 2003 assigned to the present assignee, and U.S. patent application being filed based on Japanese Application JP2003-156783 filed on Jun. 2, 2003 assigned to the present assignee. The contents of the applications is incorporated herein by reference.

The present application claims priority from Japanese application JP 2003-158755 filed on Jun. 4, 2003, the content of which is hereby incorporated by reference into this application.

BACKGROUND OF THE INVENTION

The present invention relates to a program management system which is responsive to change of a certain program or object to change other programs or objects.

Recently, a client/server program utilizes the distributed object technique to advance the effective utilization of resources and making the resources into parts. As the distributed object technique using the Internet to exceed the local network, there are the Web services (function realized by execution of programs or objects) described in, for example, "Java Web Services" by David A. Chappell etc. published by O'Reilly & Associates, Inc., March 2002, pp. 25-53, pp. 72-95 and pp. 98-139. In the Web services described in this non-patent literature, three techniques including SOAP (Simple Object Access Protocol), WSDL (Web Service Description Language) and UDDI (Universal Description Discovery and Integration) are described as the fundamental techniques of the Web services.

According to the Web services, the SOAP is the definition of envelope structure used in exchange of structured documents and the structured document described in accordance with the definition is named a SOAP message. In the client/server program using the Web services, the SOAP message is used to make communication.

The WSDL is a format of the structured document for defining the interface of the Web services. In the client/server program using the Web services, the WSDL file described in accordance with the WSDL format is used as an interface to make communication using the SOAP message.

Further, the UDDI presents the global registry and the standard specification for the Web services and is opened as the registry which can be utilized in the Internet in common. Accordingly, in the client/server program using the Web services, the Web services of the server program are registered in the UDDI registry and the client program retrieves the Web services registered in the UDDI registry to thereby make it possible to utilize the Web services of the server program.

SUMMARY OF THE INVENTION

It is considered that interface definition information in the destination to which an access request is transmitted is changed to thereby change the client program in the distributed technique. It is assumed that the maintenance operator understands that the cause of reception of an error message by the client program is due to the change of the interface definition information and corrects the client program on the basis of the changed interface definition information.

In the maintenance operation of the client program as described above, it is confirmed whether the transmitted message causing the error is generated in accordance with the unrevised interface definition information or not. When the generated message is exactly generated in accordance with the unrevised interface definition information, the revised interface definition information is gotten to correct the client program so that the message generated in accordance with the revised interface definition information is transmitted.

However, the client program is merely generated on the basis of the interface definition information and the model in the prior art method. Accordingly, even if the maintenance operator understands that the error occurred in the client program being executed is due to the change of the interface definition information, the maintenance operator is required to do time-consuming work such as stopping the client program once, getting the revised interface definition information, preparing the model of the client program in accordance with the revised interface definition information again and generating the client program while judging the correspondence relation of the changed portion of the interface definition information and the corrected portion of the program.

It is an object of the present invention to solve the above problem by providing the technique that a second program using the function of a first program can be dynamically corrected in accordance with correction of the first program.

According to the present invention, in a program management system for changing a second program in accordance with change of a first program, when change of interface definition information of the first program is detected, change of the interface definition information is notified to the second program using the function provided by the first program.

In the program management system of the present invention, when the function of the first program such as the Web service program for providing the Web services (function realized by execution of programs and objects) is utilized by the second program such as the client program through a network such as the Internet, the WSDL file in which interface definition information indicating the interface concerning data, operation and the like transferred between the Web service programs is stored is monitored. When change of the WSDL file is detected, a change notification message indicating that the WSDL file of the Web service program is changed is transmitted to the client program using the function provided by the Web service program.

When the client program receives the change notification message, the contents of the unrevised WSDL file are compared with the contents of the revised WSDL file to investigate a changed portion. The client program is corrected in accordance with the changed portion and arranged. Thereafter, the unrevised client program is stopped to execute the revised client program.

As described above, according to the present invention, since the WSDL file of the Web service program is monitored at predetermined intervals to thereby detect change of the interface of the Web service program immediately so that change management such as correction, rearrangement, suspension and re-execution of the client program being executed is made dynamically, the suspension period of the Web services due to the change of the interface of the Web services can be shortened.

As described above, according to the program management system of the present invention, the second program using the function of the first program can be corrected dynamically in accordance with correction of the first program.

Other objects, features and advantages of the invention will become apparent from the following description of the embodiments of the invention taken in conjunction with the accompanying drawings.

BRIEF DESCRIPTION OF THE DRAWINGS

FIG. 6 is a diagram showing a message tag portion of an unrevised WSDL file 53 described using a WSDL of the embodiment;

FIG. 7 is a diagram showing a message tag portion of a revised WSDL file 54 of the embodiment;

DESCRIPTION OF THE EMBODIMENTS

A program management system of an embodiment for changing a client program in response to change of a Web service program is now described.

Figure 1:
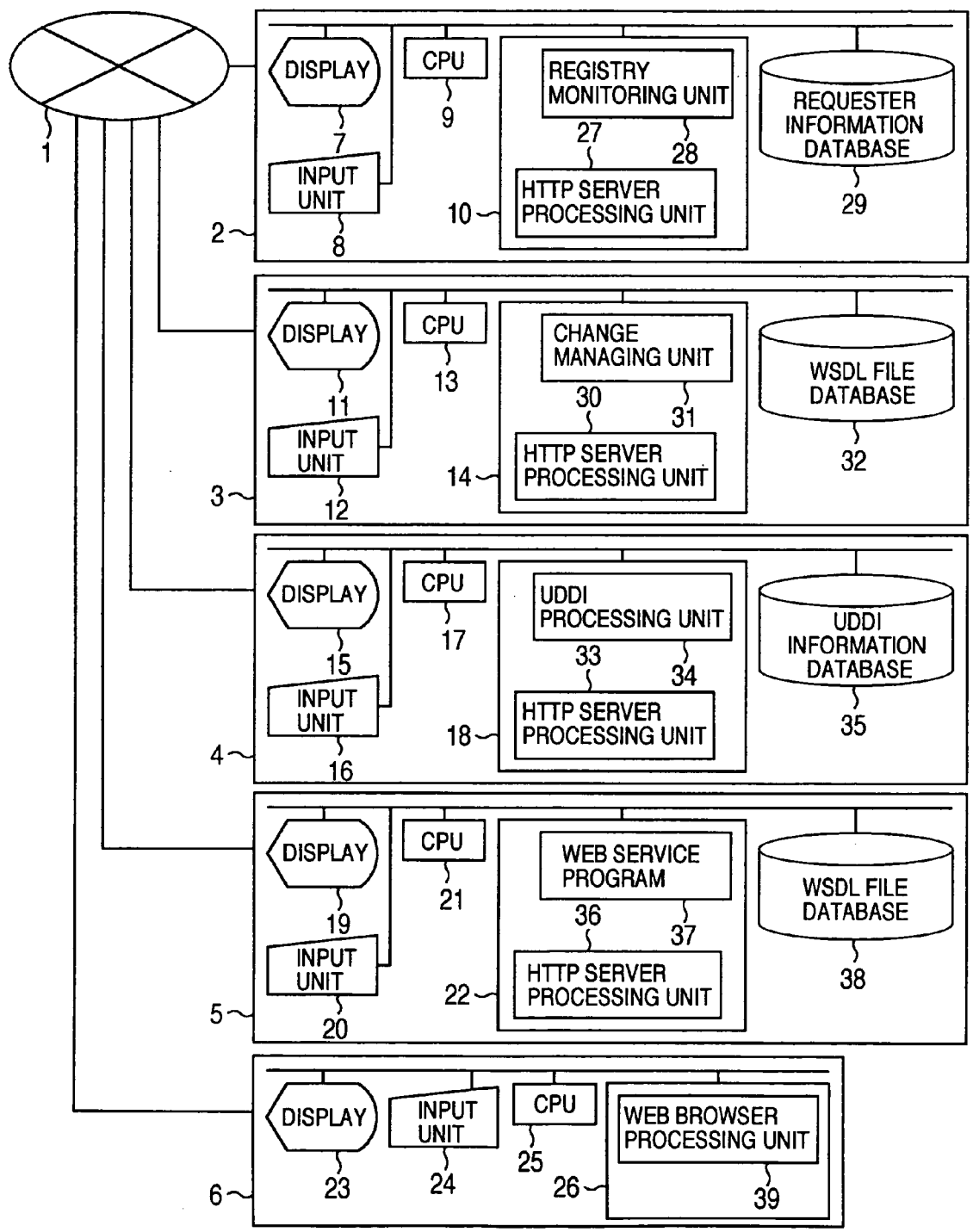
FIG. 1 is a diagram schematically illustrating a program management system of an embodiment according to the present invention.

FIG. 1 is a block diagram illustrating the program management system of the embodiment. In the embodiment, programs are subjects to be changed, although the same can be also applied to objects.

A client program server 3 connected to a network 1 is a computer having the program management function which is responsive to change of a Web service program 37 which is a first program to change the client program which is a second program and a general user side processing unit 6 is a computer for general users which utilizes the client program of the client program server 3 through the network 1.

A registry monitoring server 2 is a computer for monitoring a WSDL file which is registry information of the Web services (function realized by execution of programs or objects) at predetermined intervals. A UDDI registry 4 is a computer including a database for making registration and management of the Web services. A Web service server 5 is a computer in which the program for providing the Web services is stored.

The present invention is not limited to communication means between the server and the client, although in the embodiment the communication using the HTTP (Hyper Text Transfer Protocol) in the Internet is described as a premise. More particularly, it is supposed that the client program server 3 has the function of serving as the HTTP sever and the general user side processing unit 6 communicates with the client program server 3 by means of the Web browser. Similarly, it is supposed that the Web service server 5 has the function of serving as the HTTP server and communicates with the client program server 3 using a SOAP message, the UDDI registry 4 having the function of serving as the HTTP server and communicating with the client program server 3 using the SOAP message, the registry monitoring server 2 having the function of serving as the HTTP server and communicating with the client program server 3 and the Web service server 5 using the SOAP message.

Further, the computers may be computing machines, information processing apparatuses or programs or objects which perform such processing.

As shown in FIG. 1, the registry monitoring server 2 of the embodiment includes a display 7, an input unit 8, a CPU 9, a memory 10 and a requester information database 29, and an HTTP server processing unit 27 and a registry monitoring unit 28 are stored in the memory 10.

Figure 2:
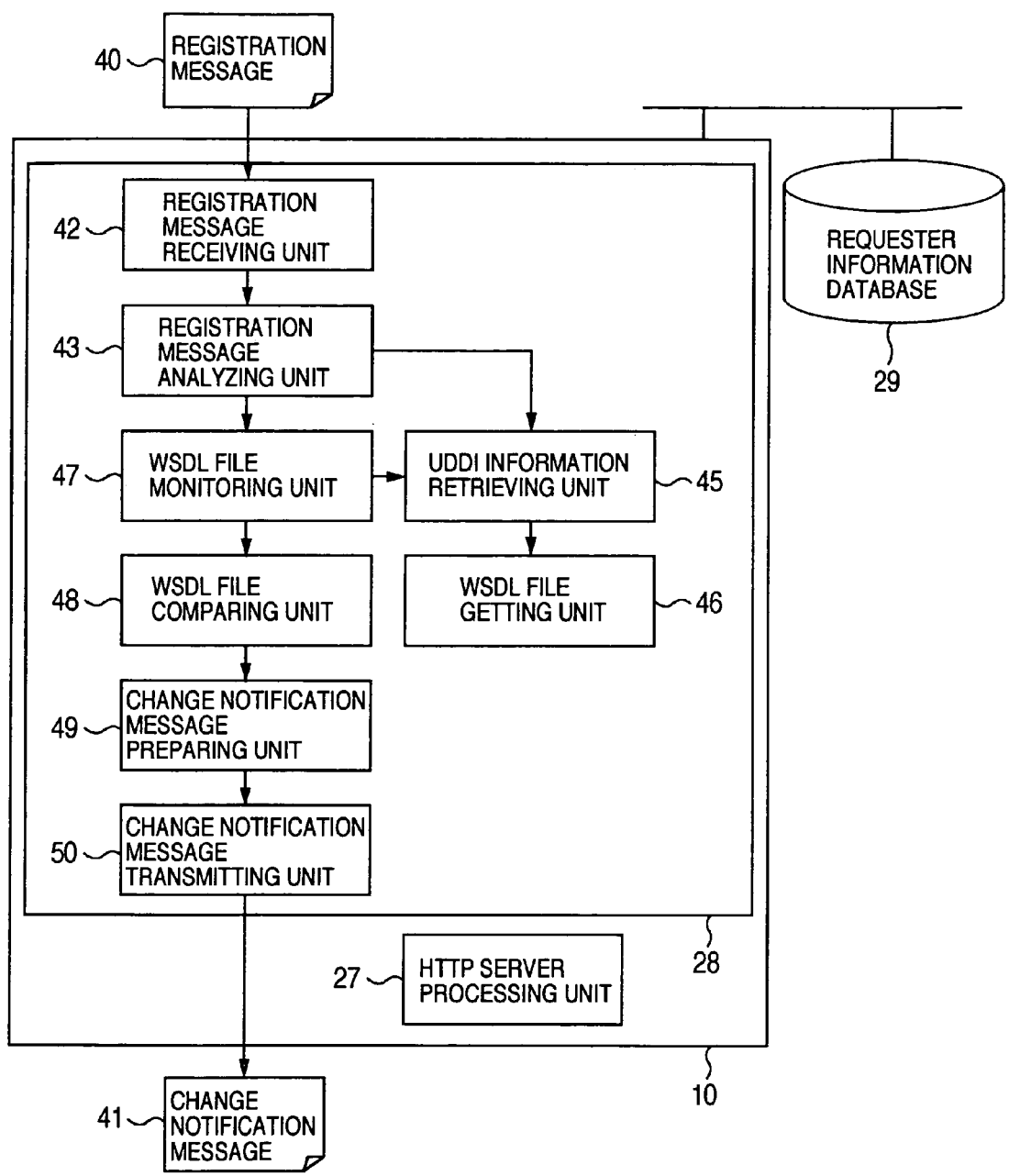
FIG. 2 is a diagram illustrating the processing of a registry monitoring unit 28 of a registry monitoring server 2 of the embodiment.

FIG. 2 is a diagram illustrating the processing of the registry monitoring unit 28 of the registry monitoring server 2 of the embodiment. As shown in FIG. 2, the registry monitoring server 2 of the embodiment includes a registration message receiving unit 42, a registration message analyzing unit 43, a UDDI information retrieving unit 45, a WSDL file getting unit 46, a WSDL file monitoring 47, a WSDL file comparing unit 48, a change notification message preparing unit 49 and a change notification message transmitting unit 50.

The registration message receiving unit 42 is a processing unit for receiving from the client program server 3 a registration message 40 indicating that a client program has been registered. The registration message analyzing unit 43 is a processing unit for analyzing the received registration message 40.

The UDDI information retrieving unit 45 is a processing unit for retrieving WSDL file storage location information in the UDDI registry 4 in accordance with a UDDI retrieval condition in the registration message 40. The WSDL file getting unit 46 is a processing unit for getting a WSDL file from the retrieved WSDL file storage location.

The WSDL file monitoring unit 47 is a processing unit for monitoring the WSDL file of the Web service program 37 at predetermined intervals. The WSDL file comparing unit 48 is a processing unit for comparing the contents of the unrevised WSDL file with the contents of the retrieved WSDL file.

The change notification message preparing unit 49 is a processing unit for preparing a change notification message notifying that the WSDL file of the Web service program 37 has been changed, when the change of the WSDL file is detected by the WSDL file monitoring unit 47.

The change notification message transmitting unit 50 is a processing unit for transmitting the change notification message when the change of the WSDL file is detected to thereby notify the change of the WSDL file to the client program using the function provided by the Web service program 37.

The program for causing the registry monitoring server 2 to function as the registration message receiving unit 42, the registration message analyzing unit 43, the UDDI information retrieving unit 45, the WSDL file getting unit 46, the WSDL file monitoring unit 47, the WSDL file comparing unit 48, the change notification message preparing unit 49 and the change notification message transmitting unit 50 is to be recorded in a recording medium such as CD-ROM and be executed by being loaded in a memory after stored in a magnetic disk or the like. The recording medium for recording the program may be other recording media except the CD-ROM. The program may be loaded in an information processing apparatus from the recording medium to be used or the recording medium may be accessed through a network to use the program.

As shown in FIG. 1, the client program server 3 includes a display 11, a data input unit 12 such as a keyboard, a CPU 13, a memory 14 and a WSDL file database 32 for storing unrevised and revised WSDL files. A change managing unit 31 and an HTTP server processing unit 30 are stored in the memory 14.

Figure 3:
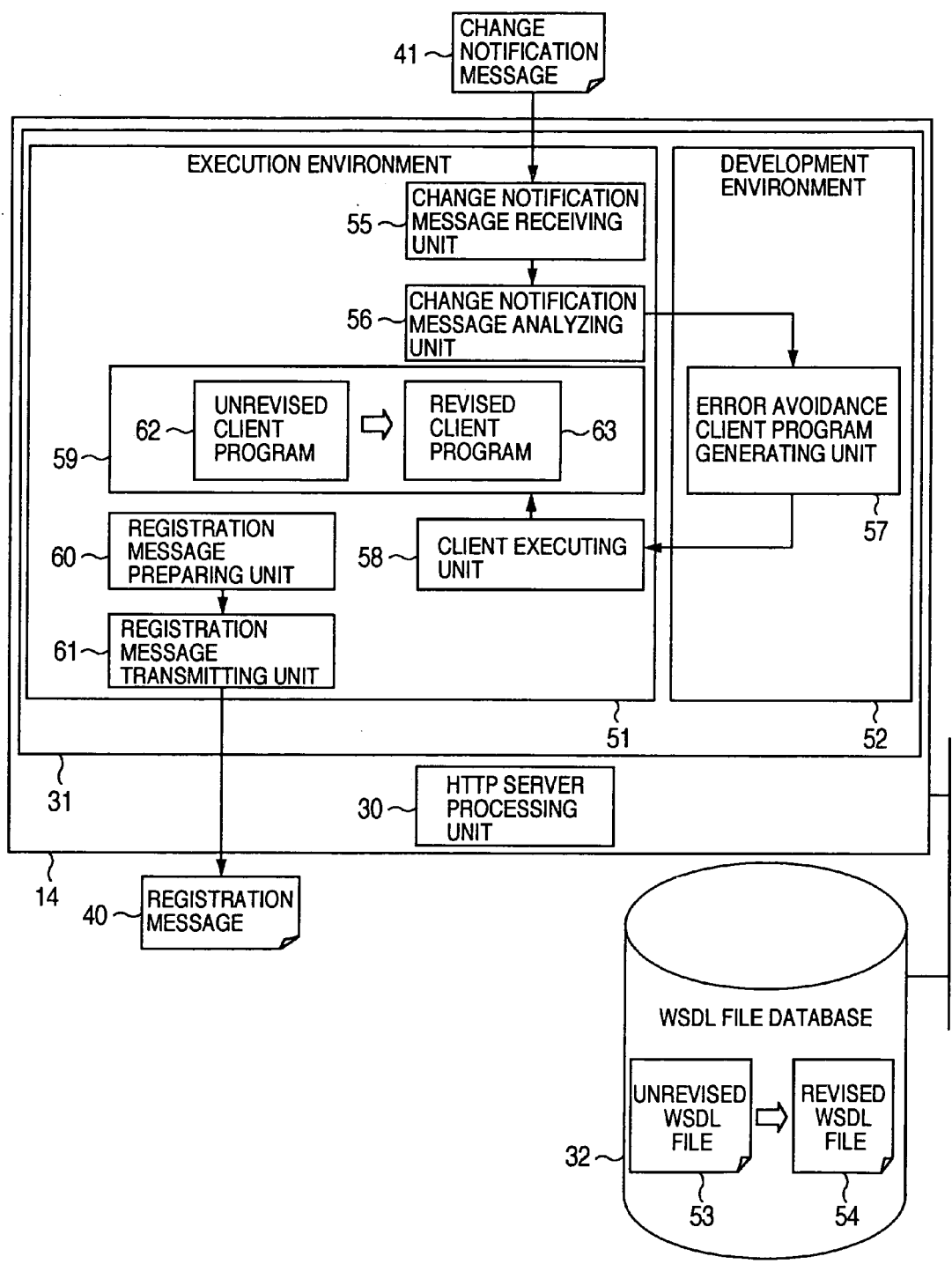
FIG. 3 is a diagram illustrating the processing of a change managing unit 31 of a client program server 3 of the embodiment.

FIG. 3 is a diagram illustrating the processing of the change managing unit 31 of the client program server 3 of the embodiment. As shown in FIG. 3, the client program server 3 includes a change notification message receiving unit 55, a change notification message analyzing unit 56, an error avoidance client program generating unit 57, a client executing unit 58, a registration message preparing unit 60 and a registration message transmitting unit 61.

The change notification message receiving unit 55 is a processing unit for receiving from the registry monitoring server 2 the change notification message 41 indicating that the WSDL file has been changed. The change notification message analyzing unit 56 is a processing unit for taking out the revised WSDL file 54 from the change notification message 41 to deliver it to the error avoidance client program generating unit 57.

The error avoidance client program generating unit 57 is a processing unit for generating the revised client program 63 from the revised WSDL file 54 received from the change notification message analyzing unit 56. The client executing unit 58 is a processing unit for receiving the revised client program 63 generated by the error avoidance client program generating unit 57 and stopping execution of the unrevised client program 62 to execute the revised client program 63.

The registration message preparing unit 60 is a processing unit for, when the client program 59 is generated, preparing the registration message 40 including a transmission destination URL 73 representing a URL of the client program server 3, a UDDI retrieval condition 74 indicating retrieval condition of the WSDL file used upon generation of the client program 59 and a monitoring interval 75 indicating a time interval for monitoring the WSDL file. The registration message transmitting unit 61 is a processing unit for transmitting to the registry monitoring server 2 the registration message 40 prepared by the registration message preparing unit 60.

The program for causing the client program server 3 to function as the change notification message receiving unit 55, the change notification message analyzing unit 56, the error avoidance client program generating unit 57, the client executing unit 58, the registration message preparing unit 60 and the registration message transmitting unit 61 is to be recorded in a recording medium such as CD-ROM and be executed by being loaded in a memory after stored in a magnetic disk or the like. The recording medium for recording the program may be other recording media except the CD-ROM. The program may be loaded in an information processing apparatus from the recording medium to be used or the recording medium may be accessed through a network to use the program.

As shown in FIG. 3, the change managing unit 31 includes an execution environment 51 and a development environment 52. The execution environment 51 includes the change notification message receiving unit 55, the change notification message analyzing unit 56, the client executing unit 58, the client program 59, the registration message preparing unit 60 and the registration message transmitting unit 61. The development environment 52 includes the error avoidance client program generating unit 57.

As shown in FIG. 1, the UDDI registry 4 includes a display 15, an input unit 16, a CPU 17, a memory 18 and a UDDI information database 35. The HTTP server processing unit 33 and the UDDI processing unit 34 are stored in the memory 18.

Figure 4:
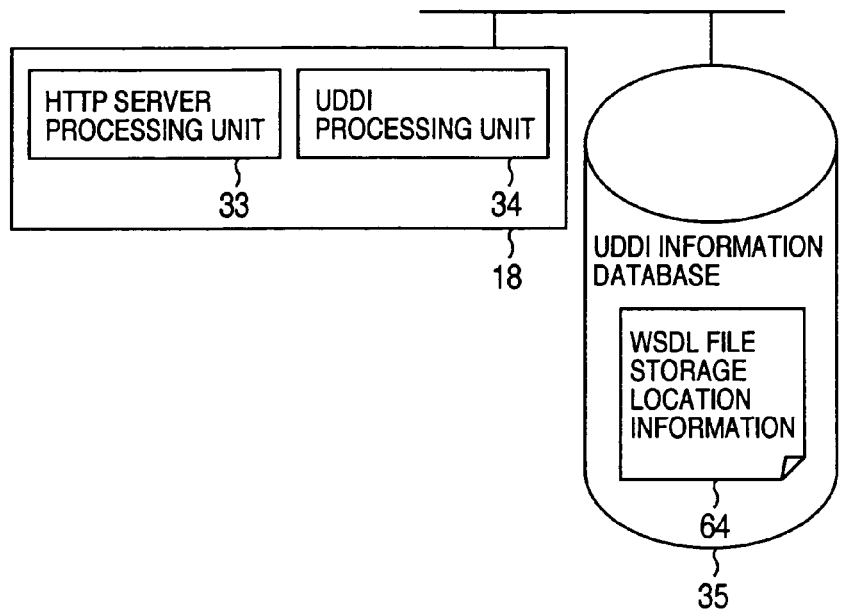
FIG. 4 is a diagram illustrating a UDDI registry 4 of the embodiment.

FIG. 4 is a diagram illustrating the UDDI registry 4 of the embodiment. As shown in FIG. 4, the UDDI registry 4 has WSDL file storage location information 64 stored in the UDDI information database 35.

As shown in FIG. 1, the Web service server 5 includes a display 19, an input unit 20, a CPU 21, a memory 22 and a WSDL file database 38, and the HTTP server processing unit 33 and the Web service program 37 are stored in the memory 22.

Further, the general user side processing unit 6 includes a display 23, an input unit 24, a CPU 25 and a memory 26, and a Web browser processing unit 39 is stored in the memory 26.

Figure 5:
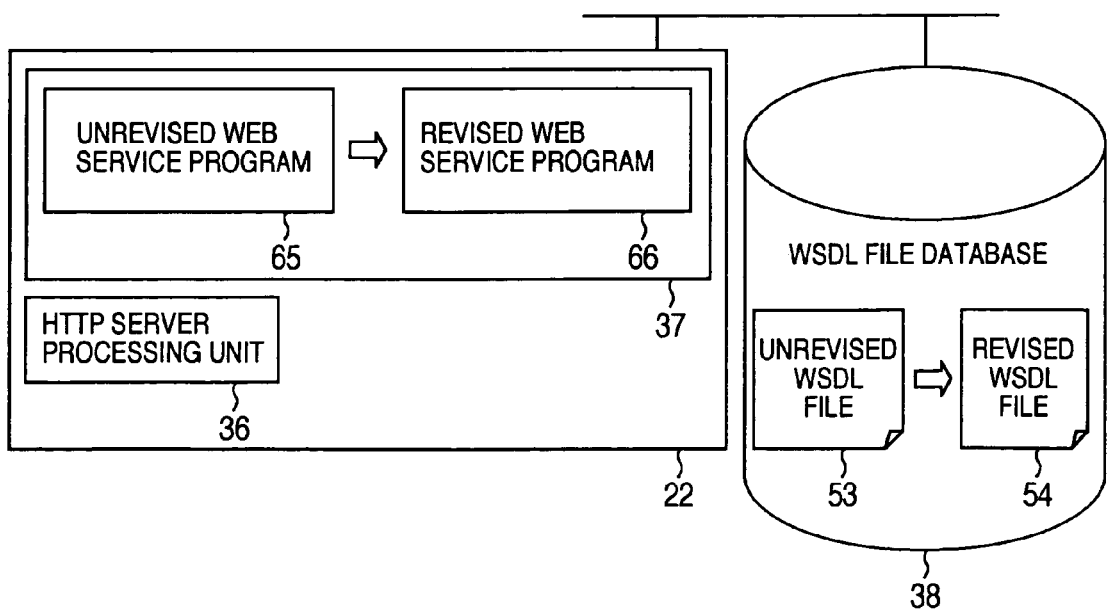
FIG. 5 is a diagram showing a change example of a Web service program 37 and a WSDL file database 38 of the embodiment.

FIG. 5 is a diagram showing a change example of the Web service program 37 and the WSDL file database 38 of the embodiment. In the Web service server 5, there is a case where the Web service program 37 or the WSDL file is changed due to the revision, and any one of the unrevised WSDL file 53 and the revised WSDL file 54 is stored in the WSDL file database 38 as the interface definition information of the Web services being operated currently.

The Web service server 5 provides the Web services in which information such as name, address, age and the like which are member information is registered and managed. The Web service server 5 uses the SOAP message as the message for receiving an access request and uses WSDL to describe the interface definition information. A message tag portion of the unrevised WSDL file 53 described using the WSDL is shown in FIG. 6.

FIG. 6 is a diagram showing the message tag portion of the unrevised WSDL file 53 described using the WSDL of the embodiment. In FIG. 6, the message tag 67 designates "setMemInfoMsg" in the name attribute as the definition of the message name for receiving a registration request of the member information. The part tag 68 defines the name of the member information and designates "Name" in the name attribute, in which string is designated in the type attribute as the definition of this type. The part tags 69 and 70 are also of string type similarly and define the address and the age of the member information, respectively.

FIG. 7 is a diagram showing the message tag portion of the revised WSDL file 54 of the embodiment. As shown in FIG. 7, the part tag 71 is added to the unrevised WSDL file 53 to prepare the revised WSDL file 54. The part tag 71 defines the birthday of the member information and designates "Birthday" in the name attribute, in which string is designated in the type attribute as the definition of this type.

Figures 8, 9:
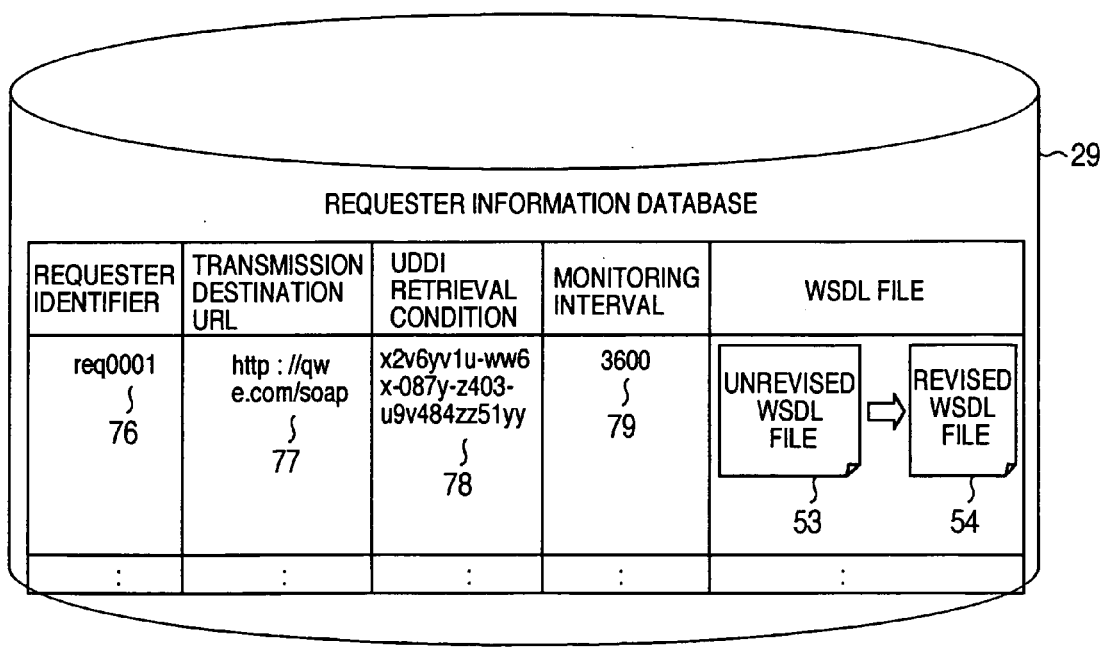
FIG. 8 is a diagram showing a definition example of the registration message 40 of the embodiment.
FIG. 9 is a diagram illustrating an example of a requester information database 29 of the embodiment.

FIG. 8 is a diagram showing a definition example of the registration message 40 of the embodiment. As shown in FIG. 8, the registration message 40 includes the transmission destination URL 73 indicating the notification destination of the change notification message 41, the UDDI retrieval condition 74 used to retrieve the WSDL file storage location information in the UDDI registry 4 and the monitoring interval 75 indicating a time interval for monitoring the WSDL file in a numerical value such as second.

FIG. 9 is a diagram showing an example of the requester information database 29 of the embodiment. As shown in FIG. 9, the requester information database 29 stores the transmission destination URL 73, the UDDI retrieval condition 74 and the monitoring interval 75 gotten from the registration message 40 in a transmission destination URL 77, a UDDI retrieval condition 78 and a monitoring interval 79 together with a request identifier 76 for identifying the request information, respectively.

Figure 10:
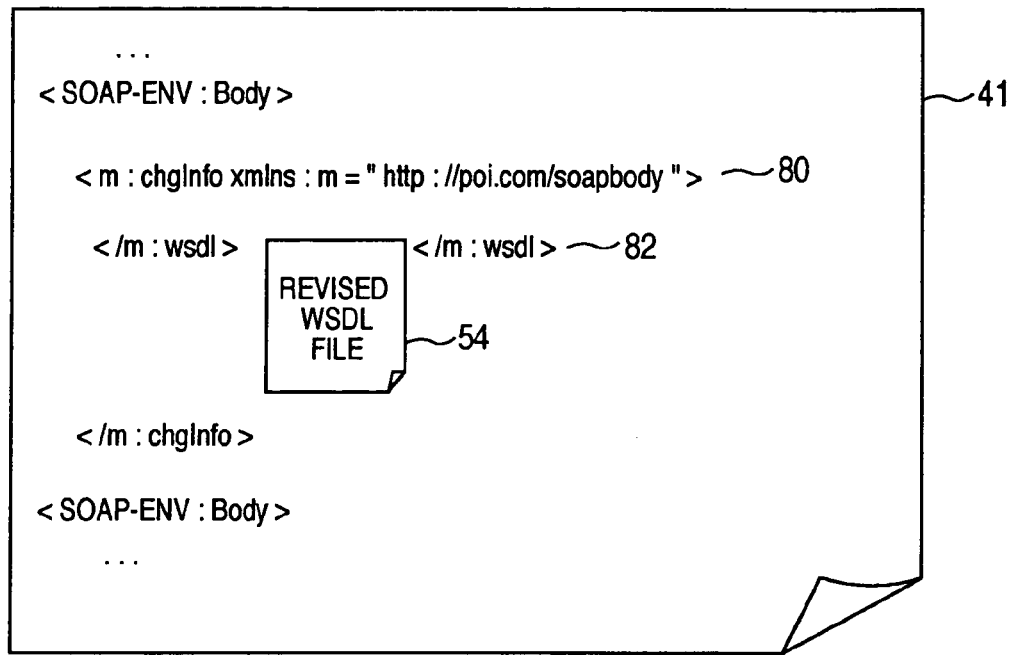
FIG. 10 is a diagram showing an example of a change notification message 41 of the embodiment.

FIG. 10 is a diagram showing an example of the change notification message 41 of the embodiment. As shown in FIG. 10, the change notification message 41 includes revised WSDL file data 82 representing the contents of the revised WSDL file 54.

Description is now made to the processing contents of the apparatuses of the embodiment in case where the registration contents of the member information are increased by one to add the birthday in order that the manager of the Web service server 5 enriches the contents of the member information provided by the Web services.

Here, it is supposed that the manager of the Web service server 5 exchanges the storage location information of the unrevised WSDL file 53 which is an interface of the service registered in the UDDI registry 4 for the storage location information of the revised WSDL file 54 and further exchanges the unrevised Web service program 65 for the revised Web service program 66 in the Web service program 37 and the unrevised WSDL file 53 for the revised WSDL file 54 in the WSDL file database 38 as shown in FIG. 5, respectively. The message tag portion of the revised WSDL file 54 at this time is as shown in FIG. 7.

The processing of the registry monitoring unit 28 in case where the interface of the Web service program 37 of the Web service server 5 is changed from the unrevised WSDL file 53 to the revised WSDL file 54 after the client program 59 using the Web service program 37 of the Web service server 5 has been registered is now described with reference to FIG. 2.

First, in order to monitor the registry information of the Web service server 5, the registry monitoring unit 28 receives the registration message 40 from the client program server 3 by means of the registration message receiving unit 42 and executes the processing of the registration message analyzing unit 43, the UDDI information retrieving unit 45, the WSDL file getting unit 46 and the WSDL file monitoring unit 47 successively.

The WSDL file monitoring unit 47 executes the processing of the UDDI information retrieving unit 45, the WSDL file getting unit 46 and the WSDL file comparing unit 48 successively in order to monitor the registry information of the Web service server 5 on the basis of the request information registered in the requester information database 29 at predetermined intervals.

When the WSDL file comparing unit 48 compares the unrevised WSDL file 53 with the gotten WSDL file and detects any difference therebetween, the WSDL file comparing unit 48 executes the processing of the change notification message transmitting unit 50 after execution of the change notification message preparing unit 49 and transmits the change notification message 41 to the client program server 3.

The detail of the processing shown in FIG. 2 is now described.

Figure 11:
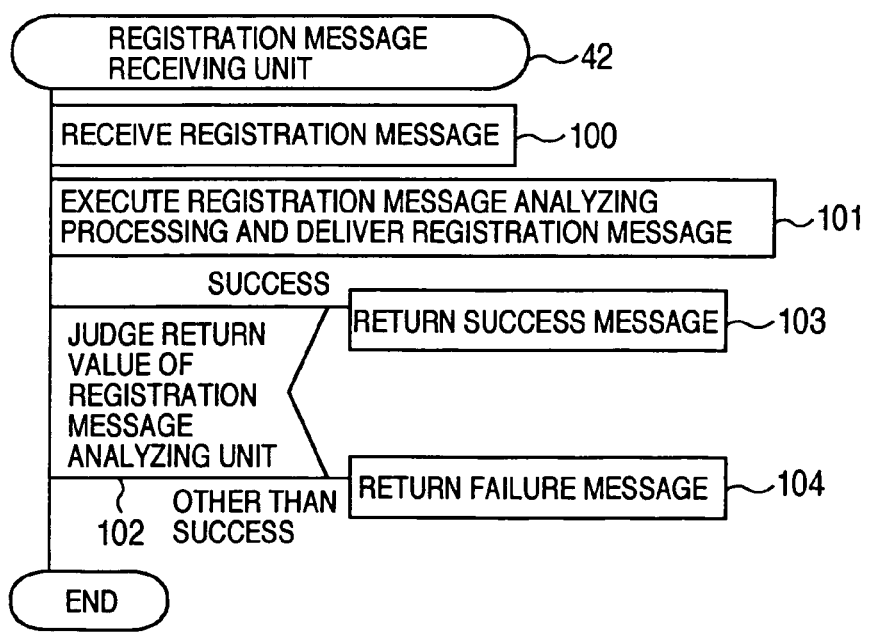
FIG. 11 is a flow chart showing the processing procedure of a registration message receiving unit 42 of the embodiment.

FIG. 11 is a flow chart showing the processing procedure of the registration message receiving unit 42 of the embodiment. First, the registration message receiving unit 42 receives the registration message 40 from the client program server 3 (100).

Next, the registration message receiving unit 42 executes the processing of the registration message analyzing unit 43 and delivers the received registration message 40 to the registration message analyzing unit 43 (101). The registration message receiving unit 42 judges a return value from the registration message analyzing unit 43 (102). When the return value from the registration message analyzing unit 43 indicates the success of the registration message analyzing processing, the registration message receiving unit 42 transmits a success message indicating that the registration of requester information is successful to the client program server 3 (103) and when the return value from the registration message analyzing unit 43 indicates any other value than the success, the registration message receiving unit 42 transmits a failure message indicating that the registration of the requester information is failed to the client program server 3 (104).

Figure 12:
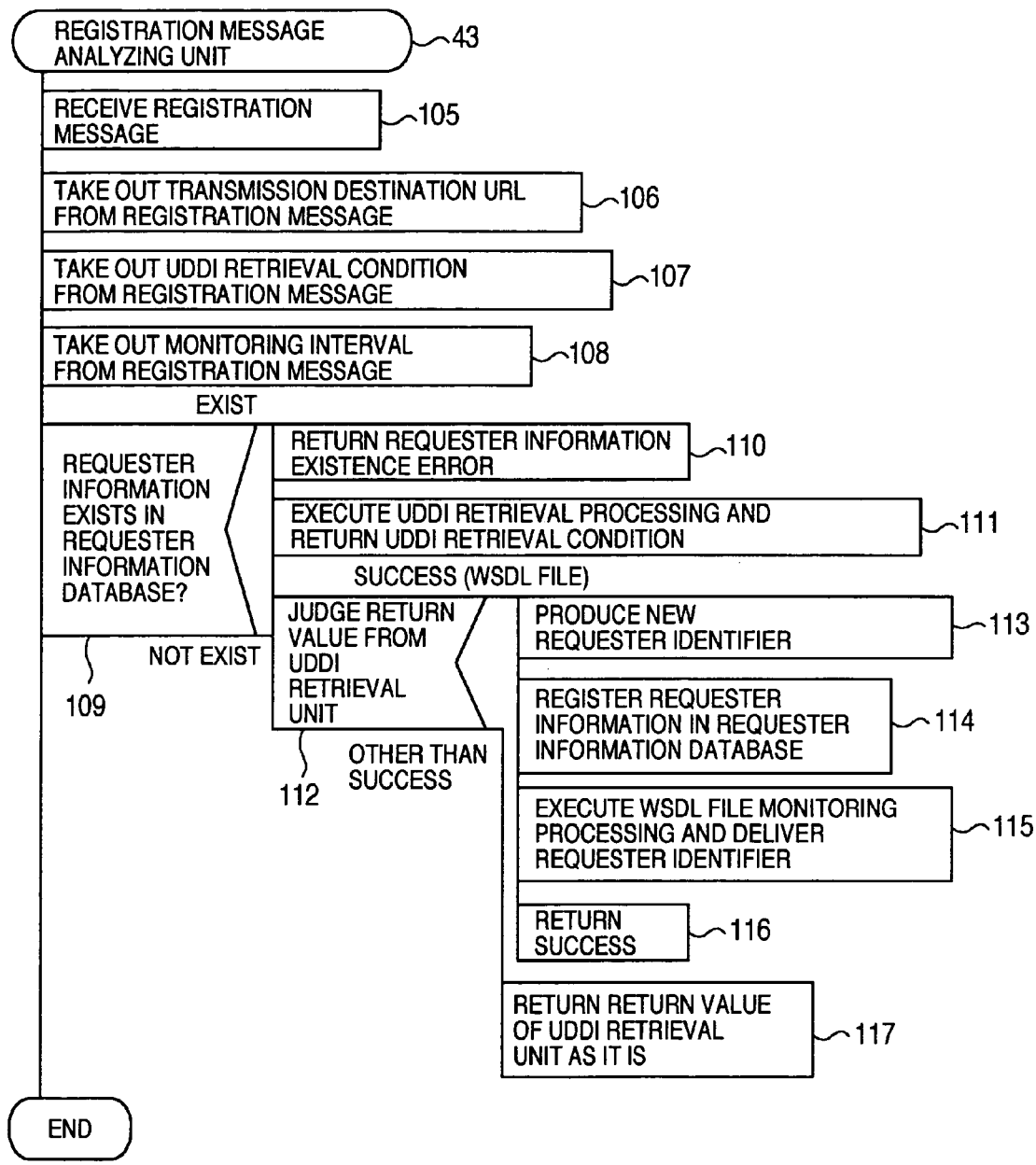
FIG. 12 is a flow chart showing the processing procedure of a registration message analyzing unit 43 of the embodiment.

FIG. 12 is a flow chart showing the processing procedure of the registration message analyzing unit 43 of the embodiment. First, the registration message analyzing unit 43 receives the registration message 40 from the registration message receiving unit 42 (105).

Next, the registration message analyzing unit 43 takes out the transmission destination URL 73 from the received registration message 40 (106). Similarly, the registration message analyzing unit 43 takes out the UDDI retrieval condition 74 (107) and the monitoring interval 75 (108).

The registration message analyzing unit 43 judges on the basis of the transmission destination URL 73 and the UDDI retrieval condition 74 whether the requester information to be registered already exists in the requester information database 29 or not (109).

When the requester information to be registered already exists in the requester information database 29, the registration message analyzing unit 43 returns the requester information existence error (110) and when it does not exist, the registration message analyzing unit 43 executes the processing of the UDDI information retrieving unit 45 and returns the UDDI retrieval condition 74 to the UDDI information retrieving unit 45 (111).

The registration message analyzing unit 43 judges the return value from the UDDI information retrieving unit 45

(112) and when the return value from the UDDI information retrieving unit 45 indicates that the retrieval of the WSDL file storage location information 64 is successful, the registration message analyzing unit 43 produces a new requester identifier 76 (113) and registers the requester information in the requester information database 29 (114). The registration message analyzing unit 43 also executes the processing of the WSDL file monitoring unit 47 to deliver the requester identifier 76 to the WSDL file monitoring unit 47 (115) and returns the return value indicating the success of the registration message analyzing processing to the registration message receiving unit 42 (116). Further, when the return value from the UDDI information retrieving unit 45 is any other value than the success, the registration message analyzing unit 43 returns the return value from the UDDI information retrieving unit 45 to the registration message receiving unit 42 as it is (117).

Figure 13:
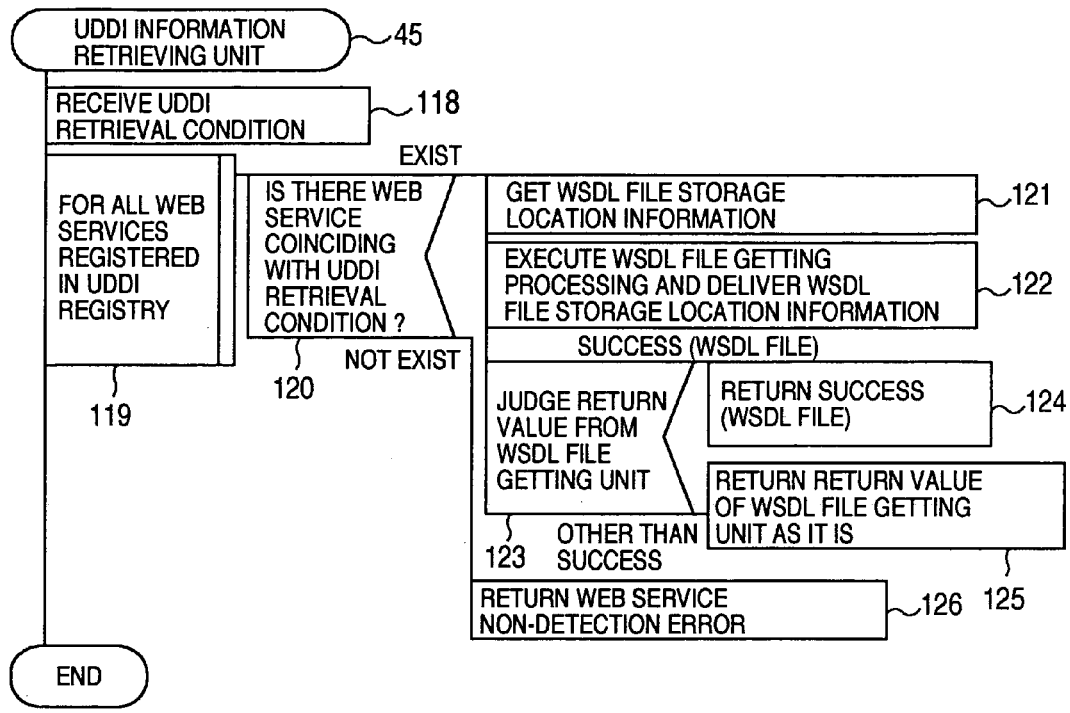
FIG. 13 is a flow chart showing the processing procedure of a UDDI information retrieving unit 45 of the embodiment.

FIG. 13 is a flow chart showing the processing procedure of the UDDI information retrieving unit 45 of the embodiment. First, the UDDI information retrieving unit 45 receives the UDDI retrieval condition 74 from the registration message analyzing unit 43 or the WSDL file monitoring unit 47 (118).

Next, the UDDI information retrieving unit 45 makes judgment as to whether there is the Web service coinciding with the received UDDI retrieval condition 74 or not for all the Web services registered in the UDDI information database 35 of the UDDI registry 4 (119, 120).

When there is the Web service coinciding with the UDDI retrieval condition 74, the UDDI information retrieving unit 45 gets the WSDL file storage location information 64 indicative of the storage location of the WSDL file of the Web service program 37 providing the Web services from the UDDI information database 35 (121) and executes the processing of the WSDL file getting unit 46 to deliver the WSDL file storage location information 64 to the WSDL file getting unit 46 (122).

The UDDI information retrieving unit 45 judges the return value from the WSDL file getting unit 46 (123). When the return value indicates the success of the WSDL file getting processing, the UDDI information retrieving unit 45 returns the WSDL file returned from the WSDL file getting unit 46 together with the return value to a calling source such as the registration message analyzing unit 43 or the WSDL file monitoring unit 47 (124) and when the return value from the WSDL file getting unit 46 is any other value than the success, the UDDI information retrieving unit 45 returns the return value to the calling source as it is (125). Further, when the Web service coinciding with the UDDI retrieval condition 74 do not exist in the UDDI information database 35, the UDDI information retrieving unit 45 returns the return value indicating a Web service non-detection error to the calling source (126).

Figure 14:
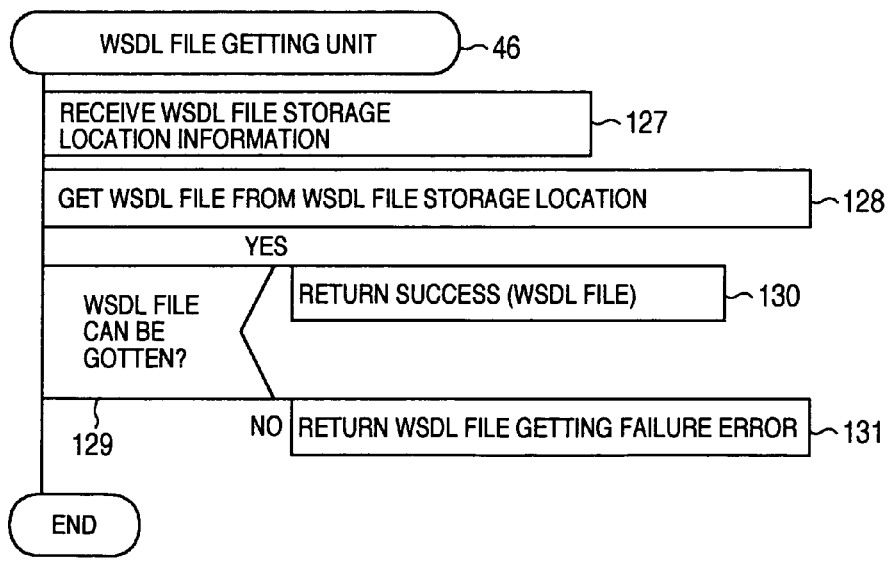
FIG. 14 is a flow chart showing the processing procedure of a WSDL file getting unit 46 of the embodiment.

FIG. 14 is a flow chart showing the processing procedure of the WSDL file getting unit 46 of the embodiment. First, the WSDL file getting unit 46 receives the WSDL file storage location information 64 from the UDDI information retrieving unit 45 (127).

Then, the WSDL file getting unit 46 accesses to the location indicated by the received WSDL file storage location information 64 to get the WSDL file (128). Next, the WSDL file getting unit 46 judges whether the WSDL file can be gotten from the location indicated by the WSDL file storage location information 64 or not (129) and when it can be gotten, the WSDL file getting unit 46 returns the return value containing the gotten WSDL file to the UDDI information retrieving unit 45 (130). When the WSDL file cannot be gotten from the location indicated by the WSDL file storage location information 64, the WSDL file getting unit 46 returns the return value indicating an WSDL file getting failure error to the UDDI information retrieving unit 45 (131).

Figure 15:
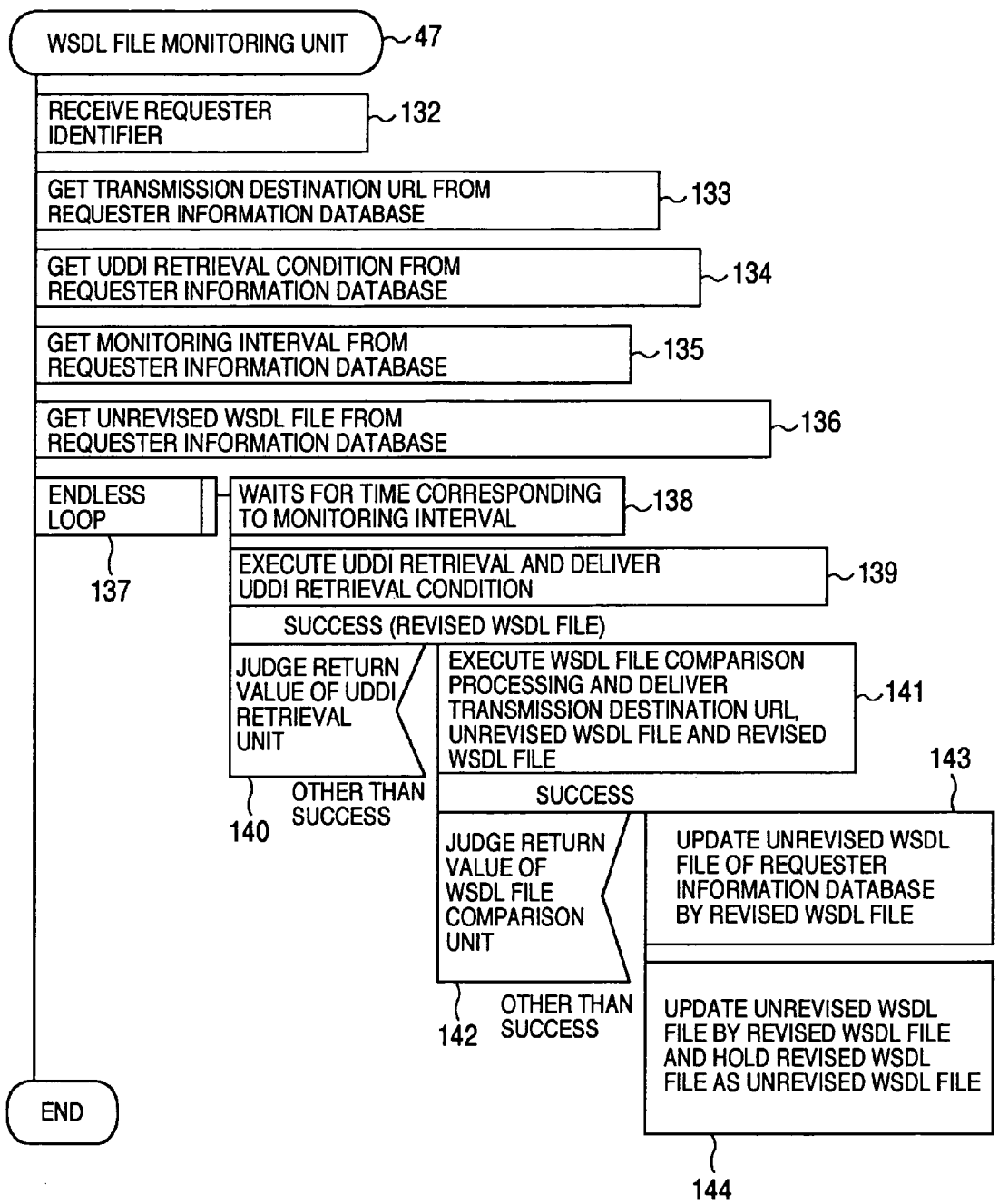
FIG. 15 is a flow chart showing the processing procedure of a WSDL file monitoring unit 47 of the embodiment.

FIG. 15 is a flow chart showing the processing procedure of the WSDL file monitoring unit 47 of the embodiment. First, the WSDL file monitoring unit 47 receives the requester identifier 76 from the registration message analyzing unit 43 (132).

Next, the WSDL file monitoring unit 47 gets the transmission destination URL 77 from the requester information database 29 on the basis of the received requester identifier 76 (133). Similarly, the WSDL file monitoring unit 47 gets the UDDI retrieval condition 78 (134), the monitoring interval 79 (135) and the unrevised WSDL file 53 (136).

The WSDL file monitoring unit 47 goes into an endless loop so as to monitor the registry information of the Web service server 5 (137). After the WSDL file monitoring unit 47 waits until the time corresponding to the monitoring interval 79 passes (138), the WSDL file monitoring unit 47 executes the processing of the UDDI information retrieving unit 45 and delivers the UDDI retrieval condition 78 to the UDDI information retrieving unit 45 (139).

Thereafter, the WSDL file monitoring unit 47 judges the return value from the UDDI information retrieving unit 45 (140) and when the return value indicates the success, the WSDL file monitoring unit 47 executes the processing of the WSDL file comparing unit 48 and delivers the transmission destination URL 77, the unrevised WSDL file 53 and the WSDL file retrieved by the UDDI information retrieval processing to the WSDL file comparing unit 48 (141).

The WSDL file monitoring unit 47 judges the return value from the WSDL file comparing unit 48 (142) and when the return value indicates the success, that is, when change of the WSDL file is detected by the WSDL file comparing unit 48, the unrevised WSDL file 53 of the requester information database 29 is updated by the retrieved unrevised WSDL file 54 (143) and the revised WSDL file 54 is held as the unrevised WSDL file 53 (144).

Figure 16:
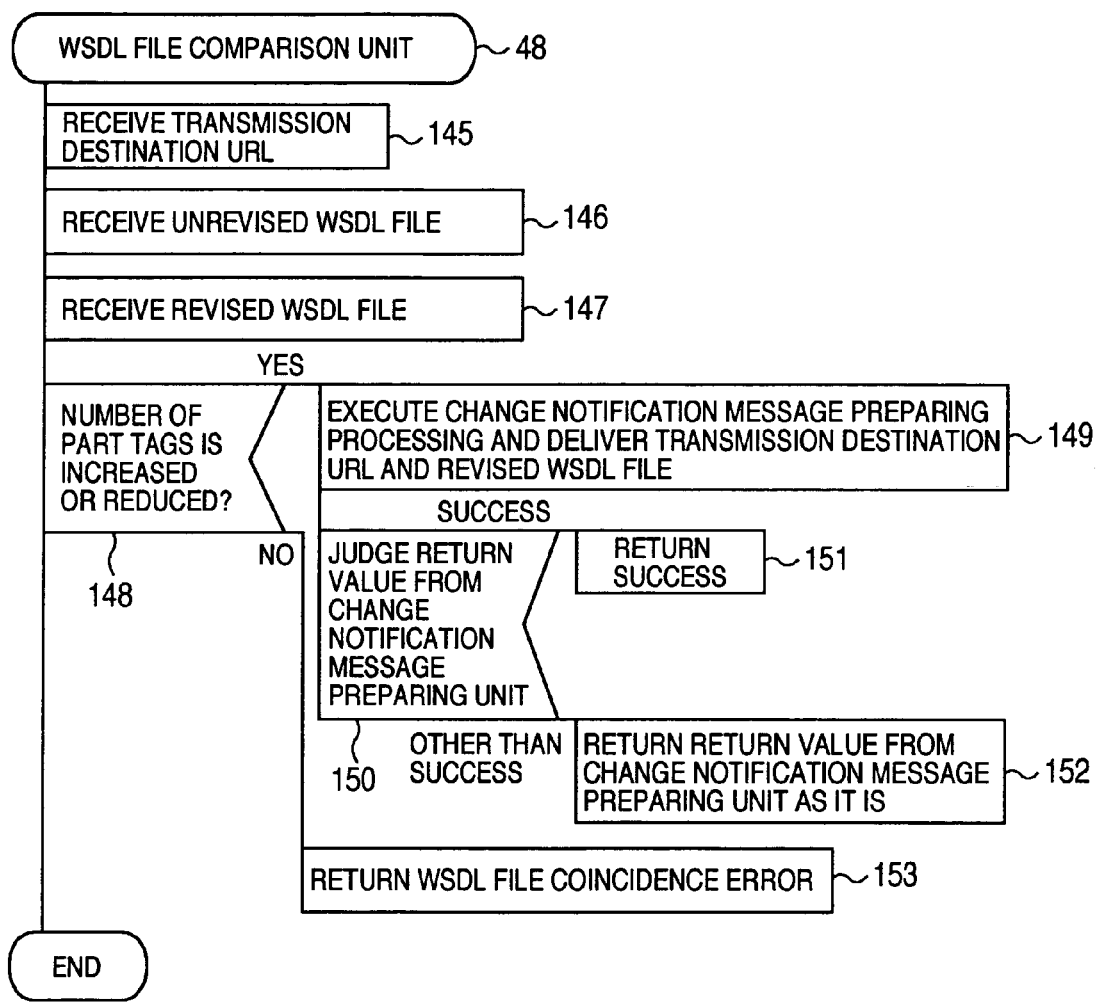
FIG. 16 is a flow chart showing the processing procedure of a WSDL file comparing unit 48 of the embodiment.

FIG. 16 is a flow chart showing the processing procedure of the WSDL file comparing unit 48 of the embodiment. First, the WSDL file comparing unit 48 receives the transmission destination URL 77 (145), the unrevised WSDL file 53 (146) and the revised WSDL file 54 (147) from the WSDL file monitoring unit 47 successively.

Next, the WSDL file comparing unit 48 compares the unrevised WSDL file 53 with the revised WSDL file 54 to judge whether the number of part tags is increased or reduced. When the number of part tags is increased or reduced, the WSDL file comparing unit 48 executes the processing of the change notification message preparing unit 49 to deliver the transmission destination URL 77 and the revised WSDL file 54 to the change notification message preparing unit 49 (149).

The WSDL file comparing unit 48 judges the return value from the change notification message preparing unit 49 (150). When the return value indicates the success of the change notification message preparation processing, the WSDL file comparing unit 48 returns the return value indicating the success, that is, the return value indicating that change of the WSDL file is detected to the WSDL file monitoring unit 47 (151). When the return value is any other value than the success, the WSDL file comparing unit 48 returns the return value from the change notification message preparing unit 49 to the WSDL file monitoring unit 47 as it is (152). Further, when the number of part tags is not increased or reduced, the WSDL file comparing unit 48 returns the return value indicating a WSDL file coincidence error, that is, the return value indicating that change of the WSDL file is not detected to the WSDL file monitoring unit 47 (153). Further, the contents of the unrevised WSDL file and the revised WSDL file may be compared with each other in addition to the number of part tags to detect change of the WSDL file.

Figure 17:
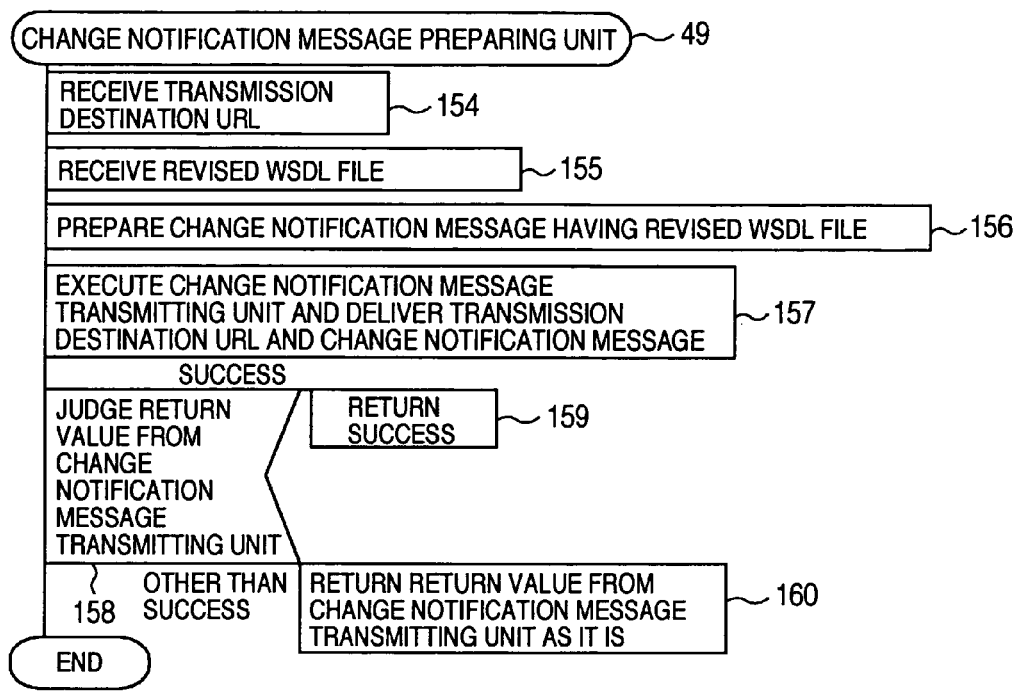
FIG. 17 is a flow chart showing the processing procedure of a change notification message preparing unit 49 of the embodiment.

FIG. 17 is a flow chart showing the processing procedure of the change notification message preparing unit 49 of the embodiment. First, the change notification message preparing unit 49 receives the transmission destination URL 77 (154) and the revised WSDL file 54 (155) from the WSDL file comparing unit 48.

Next, the change notification message preparing unit 49 prepares the change notification message 41 having the revised WSDL file 54 (156). The change notification message preparing unit 49 executes the processing of the change notification message transmitting unit 50 and delivers the transmission destination URL 77 and the change notification message 41 to the change notification message transmitting unit 50 (157). Thereafter, the change notification message preparing unit 49 judges the return value from the change notification message transmitting unit 50 (158). When the return value indicates the success, the change notification message preparing unit 49 returns the return value indicating the success to the WSDL file comparing unit 48 (159) and when the return value indicates any other value than the success, the change notification message preparing unit 49 returns the return value from the change notification message transmitting unit 50 to the WSDL file comparing unit 48 as it is (160).

Figure 18:
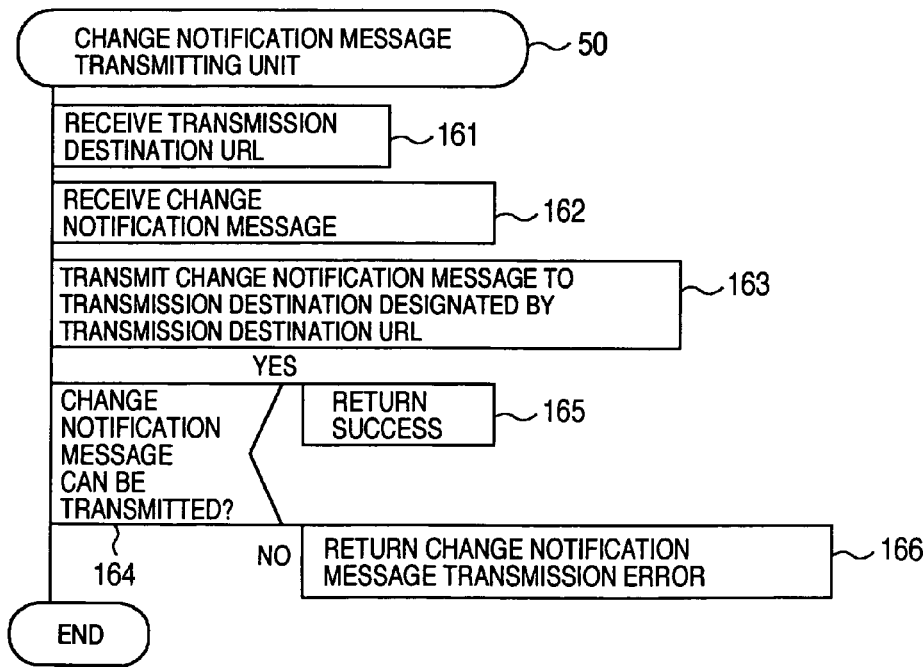
FIG. 18 is a flow chart showing the processing procedure of a change notification message transmitting unit 50 of the embodiment.

FIG. 18 is a flow chart showing the processing procedure of the change notification message transmitting unit 50 of the embodiment. First, the change notification message transmitting unit 50 receives the transmission destination URL 77 (161) and the change notification message 41 (162) from the change notification message preparing unit 49.

Next, the change notification message transmitting unit 50 transmits the received change notification message 41 to the transmission destination designated by the transmission destination URL 77 (163). The change notification message transmitting unit 50 judges whether the change notification message 41 can be transmitted (164). When it can be transmitted, the change notification message transmitting unit 50 returns the return value indicating that the change notification message transmitting processing is successful to the change notification message preparing unit 49 (165) and when the change notification message 41 cannot be transmitted, the change notification message transmitting unit 50 returns the return value indicating a change notification message transmission error to the change notification message preparing unit 49 (166).

Referring now to FIG. 3, the processing of the change managing unit 31 in case where the interface of the Web service program 37 of the Web service server 5 is changed from the unrevised WSDL file 53 to the revised WSDL file 54 is described.

First, when the registry information of the Web service server 5 is updated, the change managing unit 31 receives the change notification message 41 from the registry monitoring server 2 by means of the change notification message receiving unit 55 and executes the processing of the change notification message analyzing unit 56, the error avoidance client program generating unit 57 and the client executing unit 58 and the revised client program 59, successively. However, in order to monitor the registry information of the Web service server 5 used by the client program 59 at predetermined intervals, it is necessary to execute the processing of the registration message preparing unit 60 and the registration message transmitting unit 61 and transmit the registration message 40 to the registry monitoring server 2.

The processing of FIG. 3 is now described in detail.

Figure 19:
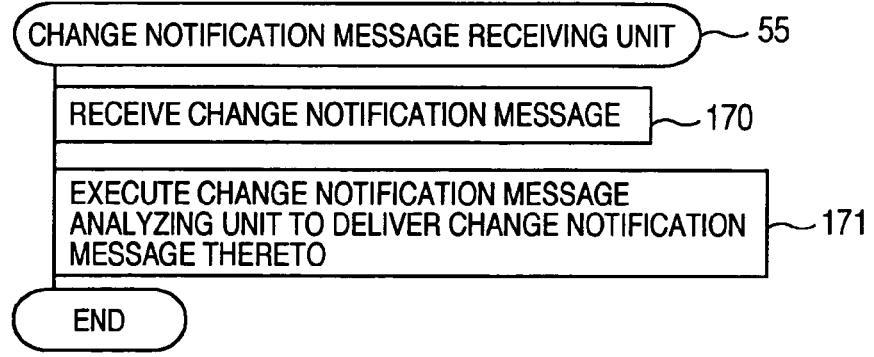
FIG. 19 is a flow chart showing the processing procedure of a change notification message receiving unit 55 of the embodiment.

FIG. 19 is a flow chart showing the processing procedure of the change notification message receiving unit 55 of the embodiment. First, the change notification message receiving unit 55 receives the change notification message 41 from the registry monitoring server 2 (170) and executes the processing of the change notification message analyzing unit 56 to deliver the change notification message 41 to the change notification message analyzing unit 56 (171).

Figure 20:
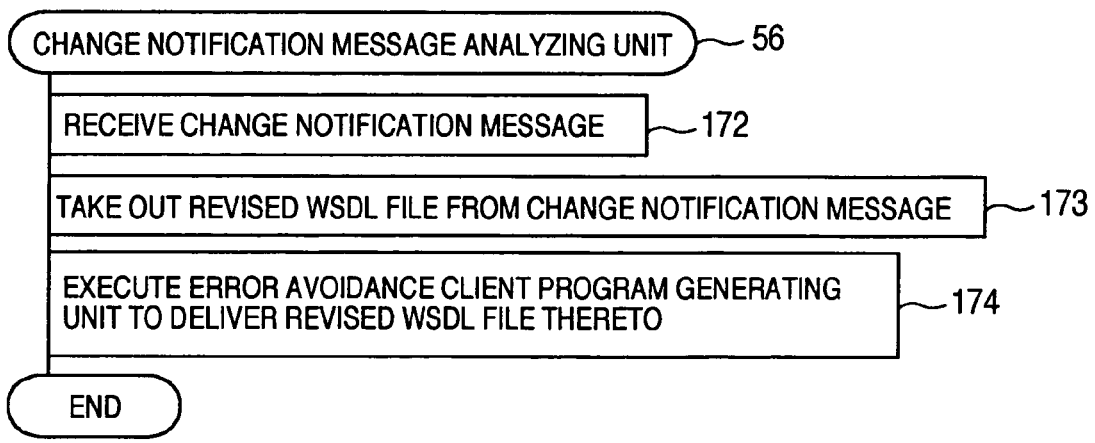
FIG. 20 is a flow chart showing the processing procedure of a change notification message analyzing unit 56 of the embodiment.

FIG. 20 is a flow chart showing the processing procedure of the change notification message analyzing unit 56 of the embodiment. First, the change notification message analyzing unit 56 receives the change notification message 41 from the change notification message receiving unit 55 (172).

Next, the change notification message analyzing unit 56 takes out the revised WSDL file 54 from the received change notification message 41 (173). The change notification message analyzing unit 56 executes the processing of the error avoidance client program generating unit 57 and delivers the taken-out revised WSDL file 54 to the error avoidance client program generating unit 57 (174).

Figure 21:
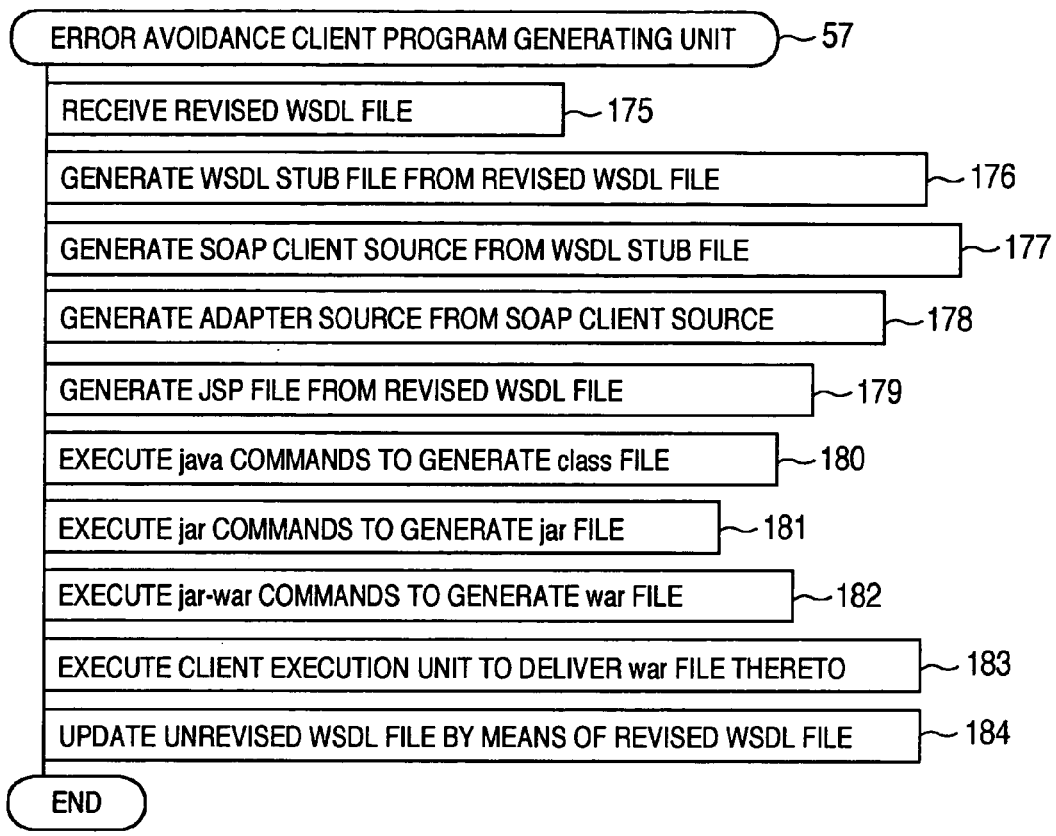
FIG. 21 is a flow chart showing the processing procedure of an error avoidance client program generating unit 57 of the embodiment.

FIG. 21 is a flow chart showing the processing procedure of the error avoidance client program generating unit 57 of the embodiment. First, the error avoidance client program generating unit 57 receives the revised WSDL file 54 from the change notification message analyzing unit 56 (175).

Next, the error avoidance client program generating unit 57 generates a WSDL stub source from the revised WSDL file 54 (176), a SOAP client source from the WSDL stub source (177) and an adapter source from the SOAP client source (178), successively.

Further, the error avoidance client program generating unit 57 generates a JSP file from the revised WSDL file 54 (179) and executes java commands to generate a class file (180). The error avoidance client program generating unit 57 further executes jar commands to generate a jar file (181) and executes jar-war commands to generate a war file (182).

The error avoidance client program generating unit 57 executes the processing of the client executing unit 58 to deliver the war file to the client executing unit 58 (183) and updates the unrevised WSDL file 53 of the WSDL file database 32 by means of the revised WSDL file 54 (184).

Figure 22:
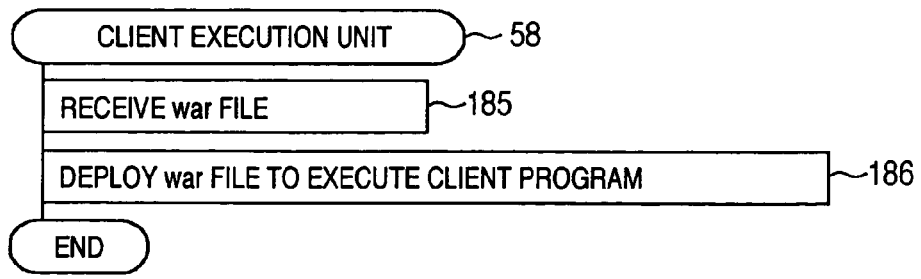
FIG. 22 is a flow chart showing the processing procedure of a client executing unit 58 of the embodiment.

FIG. 22 is a flow chart showing the processing procedure of the client executing unit 58 of the embodiment. First, the client executing unit 58 receives the war file from the error avoidance client program generating unit 57 (185) and deploys the war file to execute the client program 59 (186). At this time, the client program 59 is updated from the unrevised client program 62 to the revised client program 63 to be executed.

Further, in the embodiment, when the client program 59 is generated in the client program server 3, the registration message 40 is prepared and is registered in the registry monitoring server 2.

Figure 23:
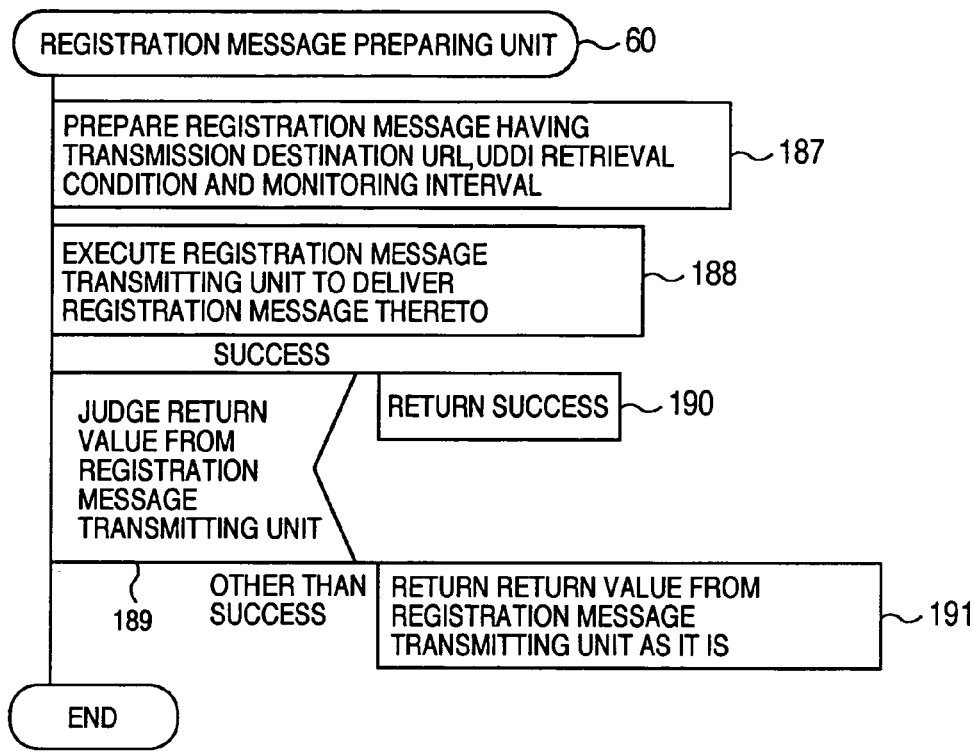
FIG. 23 is a flow chart showing the processing procedure of a registration message preparing unit 60 of the embodiment.

FIG. 23 is a flow chart showing the processing procedure of the registration message preparing unit 60 of the embodiment. First, the registration message preparing unit 60 prepares the registration message 40 having the transmission destination URL 73, the UDDI retrieval condition 74 and the monitoring interval 75 (187).

Next, the registration message preparing unit 60 executes the processing of the registration message transmitting unit 61 to deliver the prepared registration message 40 thereto (188). Then, the registration message preparing unit 60 judges the return value from the registration message transmitting unit 61 and when the return value indicates the success, the registration message preparing unit 60 returns the return value indicating the success to the calling source (190). When the return value indicates any other value than the success, the registration message preparing unit 60 returns the return value from the registration message transmitting unit 61 to the calling source (191).

Figure 24:
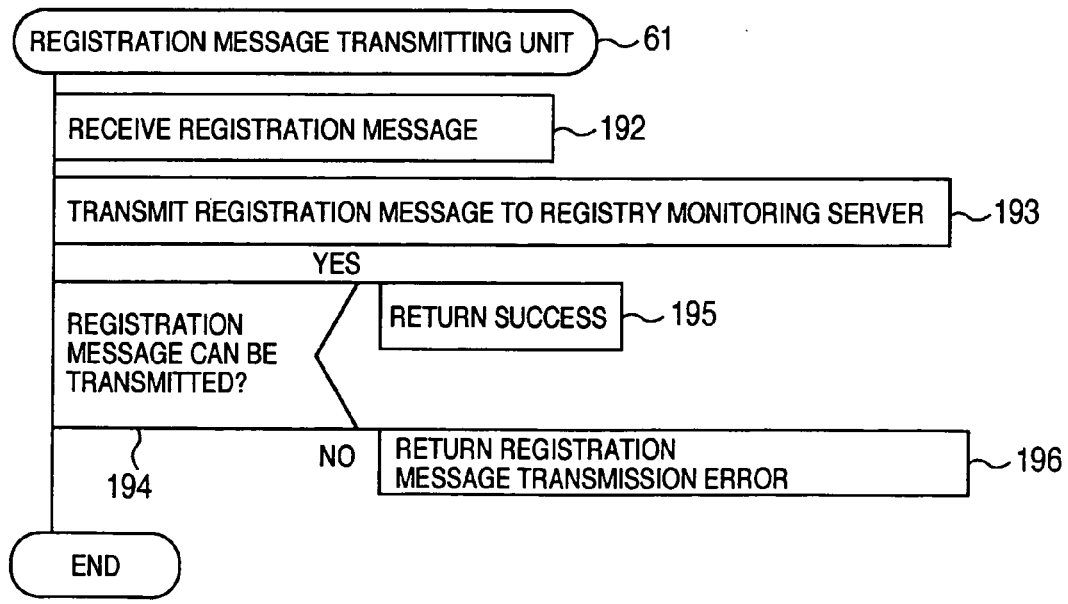
FIG. 24 is a flow chart showing the processing procedure of a registration message transmitting unit 61 of the embodiment.

FIG. 24 is a flow chart showing the processing procedure of the registration message transmitting unit 61 of the embodiment. First, the registration message transmitting unit 61 receives the registration message 40 from the registration message preparing unit 60 (192).

Next, the registration message transmitting unit 61 transmits the received registration message 40 to the registry monitoring server 2 (193). When the registration message 40 can be transmitted, the registration message transmitting unit 61 returns the return value indicating the success to the registration message preparing unit 60 (195). When the registration message 40 cannot be transmitted, the registration message transmitting unit 61 returns the return value indicating a registration message transmission error to the registration message preparing unit 60.

As described above, in the embodiment, since the WSDL file of the Web service program is monitored at predetermined intervals to detect change of the interface of the Web service program immediately so that change management such as correction, rearrangement, suspension and re-execution of the client program being executed can be made dynamically, the suspension period of the Web services due to the change of the interface of the Web service program can be shortened.

As described above, according to the program management system of the embodiment, when change of the interface definition information of a first program is detected, the change of the interface definition information is notified to a second program using the function provided by the first program and accordingly the second program using the function of the first program can be dynamically corrected in accordance with the correction of the first program.

According to the present invention, the second program using the function of the first program can be dynamically corrected in accordance with the correction of the first program.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A program management method in a Web service system providing Web services including terminals, the Web service system including a service change management apparatus, and a service apparatus which can communicate with one another, responsive to a change of a first program executed by the service apparatus to change a second program executed by the terminals, the method comprising:
    the service change management apparatus copying interface definition information indicating an interface of the first program stored in the service apparatus, and storing the copied interface definition information;
    the service apparatus notifying the service change management apparatus of change of the interface definition information upon changing the interface of the first program, by transmitting changed interface definition information to the service change management apparatus;
    the service change management apparatus comparing the store interface definition information with the changed interface definition information, analyzing any difference between them, and changing a portion of the second program corresponding to the difference; and
    wherein the service change management apparatus registers requester information containing transmission destination information indicating information processing means which has generated the second program, a retrieval condition of said interface definition information used upon generation of the second program, and unrevised interface definition information in information processing means for monitoring said interface definition information to monitor and send the change notification of said interface definition information on the basis of said requester information.

2. A program management method according to claim 1, wherein the service change management apparatus:
    retrieves UDDI information database entry which is a storage location information of said interface definition information on the basis of a retrieval condition of said interface definition information used upon generation of the second program;
    obtains said interface definition information stored in a storage location indicated by said storage location information; and
    monitors said interface definition information.

3. A program management method according to claim 1, wherein the service change management apparatus detects the change of the interface definition information by comparing unrevised interface definition information with said interface definition information obtained upon monitoring.

4. A program management method according to claim 1, wherein the service change management apparatus transmits change notification containing revised interface definition information to information processing means which has generated the second program, when the change of said interface definition information is detected.

5. A program management method according to claim 1, wherein
    the service change management apparatus decides a changed portion of the second program on the basis of changed contents of said interface definition information of which the change is notified; and
    generates a revised second program changed on the basis of said changed portion decided.

6. A service change management apparatus for monitoring interface definition information indicating an interface of a first program in a Web service system providing Web services, comprising:
    a monitoring unit for monitoring said interface definition information indicating an interface of the first program at predetermined intervals;
    a change notifying unit for notifying change of said interface definition information to a second program using the function provided by the first program when the change of said interface definition information is detected; and
    wherein the service change management apparatus registers requester information containing transmission destination information indicating information processing means which has generated the second program, a retrieval condition of said interface definition information used upon generation of the second program, and unrevised interface definition information in information processing means for monitoring said interface definition information to monitor and send the change notification of said interface definition information on the basis of said requester information.

* * * * *